(12) United States Patent
Fu et al.

(10) Patent No.: US 9,891,646 B2
(45) Date of Patent: Feb. 13, 2018

(54) CAPACITIVELY-COUPLED HYBRID PARALLEL POWER SUPPLY

(71) Applicant: QUALCOMM Incorporated, San Diego, CA (US)

(72) Inventors: Zhengming Fu, San Diego, CA (US); James Thomas Doyle, Carlsbad, CA (US); Nazanin Darbanian, San Diego, CA (US); Shree Krishna Pandey, San Diego, CA (US); Yi Cao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 14/606,753

(22) Filed: Jan. 27, 2015

(65) Prior Publication Data
US 2016/0216723 A1 Jul. 28, 2016

(51) Int. Cl.
*G05F 1/575* (2006.01)
*G05F 3/08* (2006.01)
(Continued)

(52) U.S. Cl.
CPC .............. *G05F 3/08* (2013.01); *G05F 1/575* (2013.01); *H02M 3/158* (2013.01);
(Continued)

(58) Field of Classification Search
CPC ....................................................... G05F 3/08
(Continued)

(56) References Cited

U.S. PATENT DOCUMENTS 6,509,725 B1 1/2003 Bernstein et al.
6,661,211 B1 12/2003 Currelly et al.
(Continued)

FOREIGN PATENT DOCUMENTS

CN 201867672 U 6/2011
EP 1903666 A1 3/2008
(Continued)

OTHER PUBLICATIONS

International Search Report and Written Opinion—PCT/US2015/068027—ISA/EPO—Mar. 16, 2016.
(Continued)

*Primary Examiner* — Jue Zhang
*Assistant Examiner* — Trinh Q Dang
(74) *Attorney, Agent, or Firm* — Procopio, Cory, Hargreaves & Savitch LLP (57) ABSTRACT

Operational mode changes in a system-on-a-chip (SoC) integrated circuit in a complex device such as a mobile phone cause spikes in current demand which can cause voltage droops that disrupt operation of the SoC. A hybrid parallel power supply capacitively couples a switching-mode power supply and a low-dropout voltage regulator in parallel to provide high efficiency and fast response times. The low-dropout voltage regulator may include a class-AB operational transconductance amplifier driving the coupling capacitor. The switching-mode power supply and the low-dropout voltage regulator can regulate their outputs to slightly difference voltage levels. This can allow the switching-mode power supply to supply most of the SoC's current demands.

27 Claims, 10 Drawing Sheets

(51) Int. Cl.
 *H02M 3/158* (2006.01)
 *H02M 1/00* (2006.01)
 *H02M 3/156* (2006.01)

(52) U.S. Cl.
 CPC .. *H02M 3/1582* (2013.01); *H02M 2001/0045* (2013.01); *H02M 2003/1566* (2013.01)

(58) Field of Classification Search
 USPC .......................................................... 323/313
 See application file for complete search history.

(56) References Cited

U.S. PATENT DOCUMENTS

| | | | |
|---|---|---|---|
| 7,058,373 B2 | 6/2006 | Grigore | |
| 7,145,316 B1* | 12/2006 | Galinski, III | H02M 3/156 323/224 |
| 7,710,091 B2 | 5/2010 | Huang | |
| 8,026,636 B2 | 9/2011 | Oh | |
| 8,754,622 B2 | 6/2014 | Dobkin et al. | |
| 8,773,095 B2 | 7/2014 | Gakhar et al. | |
| 2003/0137286 A1* | 7/2003 | Kimball | H02M 3/1584 323/271 |
| 2004/0239301 A1* | 12/2004 | Kobayashi | H02M 3/1588 323/284 |
| 2005/0110477 A1* | 5/2005 | Mauthe | G05F 1/465 323/316 |
| 2006/0164050 A1* | 7/2006 | Hasegawa | H02M 3/1584 323/272 |
| 2007/0024360 A1* | 2/2007 | Markowski | H03F 1/0205 330/123 |
| 2009/0066162 A1 | 3/2009 | Pant et al. | |
| 2009/0189584 A1* | 7/2009 | Suzuki | G05F 1/573 323/284 |
| 2009/0302683 A1 | 12/2009 | Wu et al. | |
| 2010/0109713 A1* | 5/2010 | Harriman | H02M 3/1584 327/103 |
| 2010/0291871 A1* | 11/2010 | Butler | G06K 19/0701 455/41.1 |
| 2011/0169327 A1* | 7/2011 | Bonnet | H02J 1/102 307/9.1 |
| 2011/0169463 A1* | 7/2011 | Yang | H02M 3/155 323/271 |
| 2011/0175583 A1* | 7/2011 | Thomas | G05F 1/56 323/280 |
| 2012/0187995 A1* | 7/2012 | Gotoh | H02M 3/156 327/233 |
| 2013/0021094 A1 | 1/2013 | Bhattacharyya et al. | |
| 2013/0162233 A1* | 6/2013 | Marty | H02M 3/158 323/274 |
| 2014/0084881 A1 | 3/2014 | Shih et al. | |
| 2014/0111169 A1* | 4/2014 | Polarouthu | H02M 3/156 323/271 |
| 2015/0162830 A1* | 6/2015 | Dong | H02M 3/158 323/271 |
| 2015/0236592 A1* | 8/2015 | Inoue | H02M 3/158 318/445 |
| 2015/0286232 A1* | 10/2015 | Parikh | G05F 1/56 323/273 |
| 2015/0381026 A1* | 12/2015 | Tournatory | H02M 3/158 323/271 |

FOREIGN PATENT DOCUMENTS

| | | |
|---|---|---|
| WO | 9903028 A1 | 1/1999 |
| WO | 2005038920 A2 | 4/2005 |
| WO | 2010131104 A2 | 11/2010 |
| WO | 2014006440 A1 | 1/2014 |

OTHER PUBLICATIONS

Co-pending U.S. Appl. No. 14/175,922, filed Feb. 7, 2014.
Li Y., et al., "High Efficiency Wide Bandwidth Power Supplies for GSM and EDGE RF Power Amplifiers", Conference Proceedings/ IEEE International Symposium on Circuits and Systems (ISCAS): May 23-26, 2005, International Conference Center, Kobe, Japan, IEEE Service Center, Piscataway, NJ, May 23, 2005 (May 23, 2005), pp. 1314-1317, XP010815779.

* cited by examiner

CAPACITIVELY-COUPLED HYBRID PARALLEL POWER SUPPLY

FIELD

Aspects of the present invention generally relate to voltage regulation and, more particularly, to a capacitively-coupled parallel combination of a low dropout voltage regulator with a switching-mode power supply to regulate voltage.

BACKGROUND

Many functions of an advanced electronic device, such as a mobile phone, are implemented in a system-on-a-chip (SoC) integrated circuit. The SoC consumes current that changes with the number and kind of operations it performs. Descriptions of an element in terms of current or power are interchangeable after scaling by a respective voltage. The operations performed can change rapidly, for example, a few nanoseconds. The change in current consumption can be large, for example, a few amps. This results in a large current time derivative (dI/dt) that can interfere with operation of the SoC.

A power distribution network supplies power, for example, as a voltage supply, to the SoC. The SoC may be packaged in an integrated-circuit package that may be mounted on an interconnection substrate, such as a printed circuit board, for connection with other components including, for example, a power supply and battery. The power distribution network includes connections through the printed circuit board and integrated-circuit package. The connections of the power distribution network can have substantial parasitic inductance. This inductance combined with the large current time derivatives can cause large spike-like dips in the supply voltage, also referred to as droop, in the voltage supplied to the SoC. The droop can be so large as to interfere with proper operation of the device.

The voltage level supplied to the SoC is generally increased (which may be referred to as guardbanding) by the amount of voltage droop so the "drooped" voltage is sufficient for proper operation of the SoC. Guardbanding the voltage level increases power consumption and is undesirable, for example, due to increased temperature and decreased battery duration. Some prior systems have attempted to reduce the voltage droop, for example, by reducing inductance in the power distribution network or adding decoupling capacitors on or close to the SoC. For example, external landside capacitors (LSCs) and embedded-passive-substrate (EPS) capacitors may be added during routing of the PDN. Added decoupling capacitors may only slightly reduce the voltage droop. Additionally, they can be size and cost prohibitive.

SUMMARY

In one aspect, a hybrid parallel power supply is provided that includes: a first power supply connected to a power rail and configured to supply current to a load device via the power rail, the first power supply being further configured to regulate the power rail to a first target voltage level; a coupling capacitor having a first terminal coupled to the power rail; and a voltage regulator coupled to a second terminal of the coupling capacitor, the voltage regulator configured to regulate the power rail to a second target voltage level.

In one aspect, a method is provided for supplying power to a load device. The method includes: supplying current from a power supply to the load device via a power rail at a first target voltage level; and supplying current from a voltage regulator to the load device via a coupling capacitor at a second target voltage level.

In one aspect, a hybrid parallel power supply is provided that includes: a first means for supplying power connected to a power rail and configured to supply current at a first target voltage level to a load device via the power rail; a coupling capacitor having a first terminal coupled to the power rail; and a means for regulating voltage coupled to a second terminal of the coupling capacitor and configured to regulate the power rail to a second target voltage level.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in simplified form in order to avoid obscuring such concepts.

Figure 1:
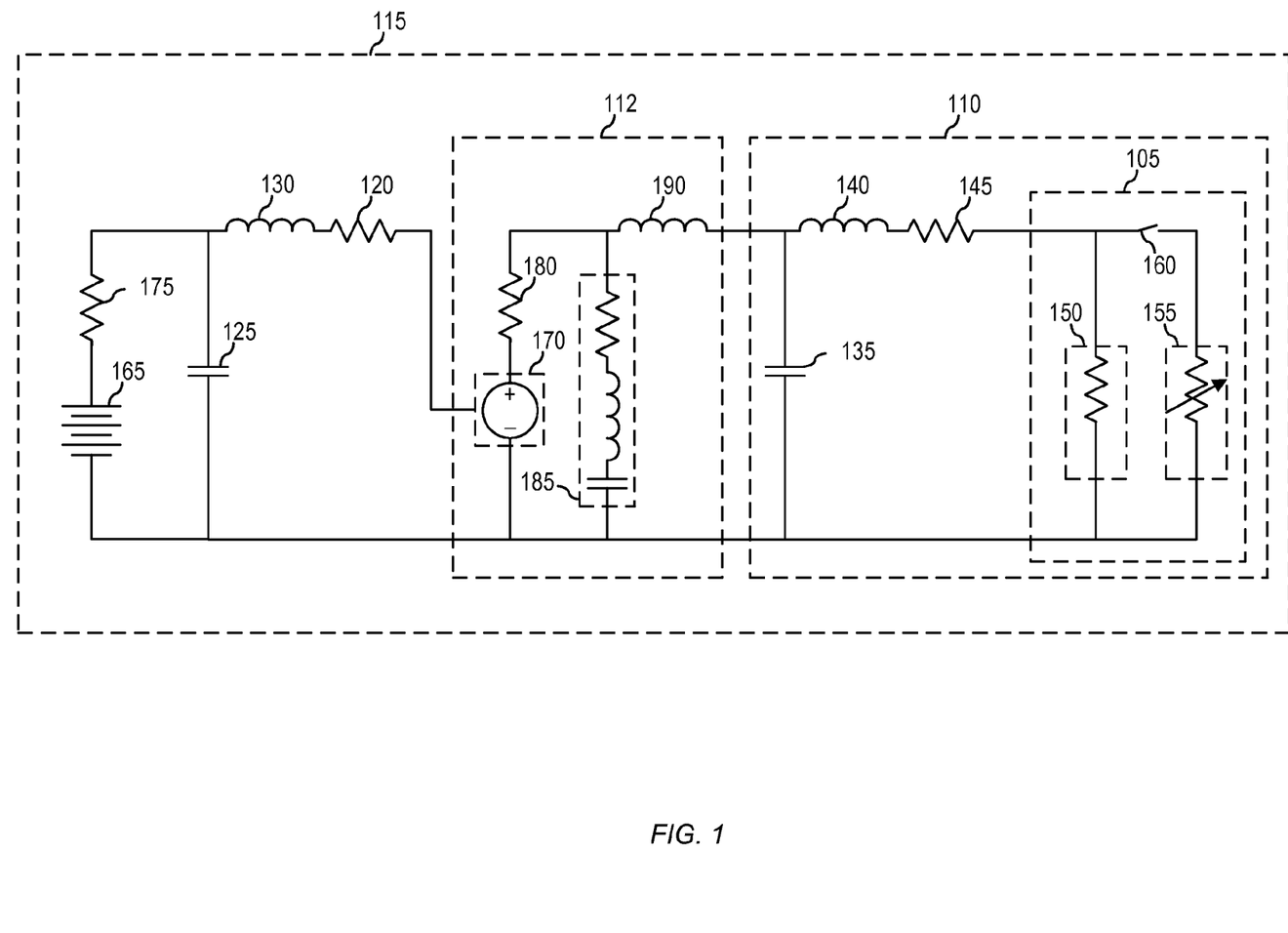
FIG. 1 is a schematic diagram of a model of a power distribution network.

FIG. 1 is a schematic diagram of a model of a power distribution network (PDN). The PDN may be segregated into interconnect domains corresponding to a die domain 105, a package domain 110, a power-supply domain 112, and a circuit-board domain 115. Each of the PDN interconnect domains includes respective combinations of resistances, capacitances, and inductances that form a characteristic impedance for that domain. The resistances, capacitances, and inductances may be referred to as parasitic elements. These parasitic elements may be aggregated into equivalent component values of resistance, capacitance, and inductance that are present between components mounted within the PDN interconnect domains. For example, the circuit-board domain 115 may contribute series inductance due to the traces conducting current from a battery 165 to a power supply 170 in the power-supply domain 112. The components within the PDN interconnect domains may have equivalent values of resistance, capacitance, and inductance that interact electrically with the parasitic elements of the PDN interconnect domains.

In the PDN model of FIG. 1, the circuit-board domain 115 includes a circuit-board-inter-planar capacitance 125 that may aggregates per unit length of interconnect traces across the interconnect substrate. The interconnect traces also contribute a circuit-board-equivalent-series resistance 120 and a circuit-board-equivalent-series inductance (L-pcb) 130 that aggregate per unit length of the trace.

The battery-equivalent impedance includes an equivalent-battery-output resistance 175 in series between the battery 165 and the parasitic elements of the circuit-board domain 115. The power supply 170 in the power-supply domain 112 receives power from the battery 165 through the equivalent-battery-output resistance 175, the circuit-board-equivalent-series resistance 120, and the circuit-board-equivalent-series inductance 130. The power supply 170 includes an equivalent-power-supply-output resistance 180. Other impedances of the power supply may be lumped into an equivalent-power-supply output impedance 185 including series inductance, resistance, and capacitance. A power-supply-domain inductance 190 models the inductance encountered in routing traces between the power supply 170 and the package domain 110.

In a fashion similar to that of the circuit-board domain 115, the package domain 110 includes a package-inter-planar capacitance 135, a package-equivalent-series inductance 140, and a package-equivalent-series resistance 145. Each of these parasitic elements aggregates per unit length that the PDN runs through the package domain 110. The die domain 105 is modeled with an equivalent-load impedance 150 and a switched-equivalent-load impedance 155. The equivalent-load impedance 150 represents portions of the SoC (which from a power distribution network viewpoint may be referred to as the load) that are not switching and/or portions of SoC circuitry that are in a continuous or standby operation. The switched-equivalent-load impedance 155 represents portions of SoC circuitry that are activated or deactivated according to particular operations of the SoC. A switch 160 symbolically represents the switched activity of the switched-equivalent-load impedance 155.

Figure 2:
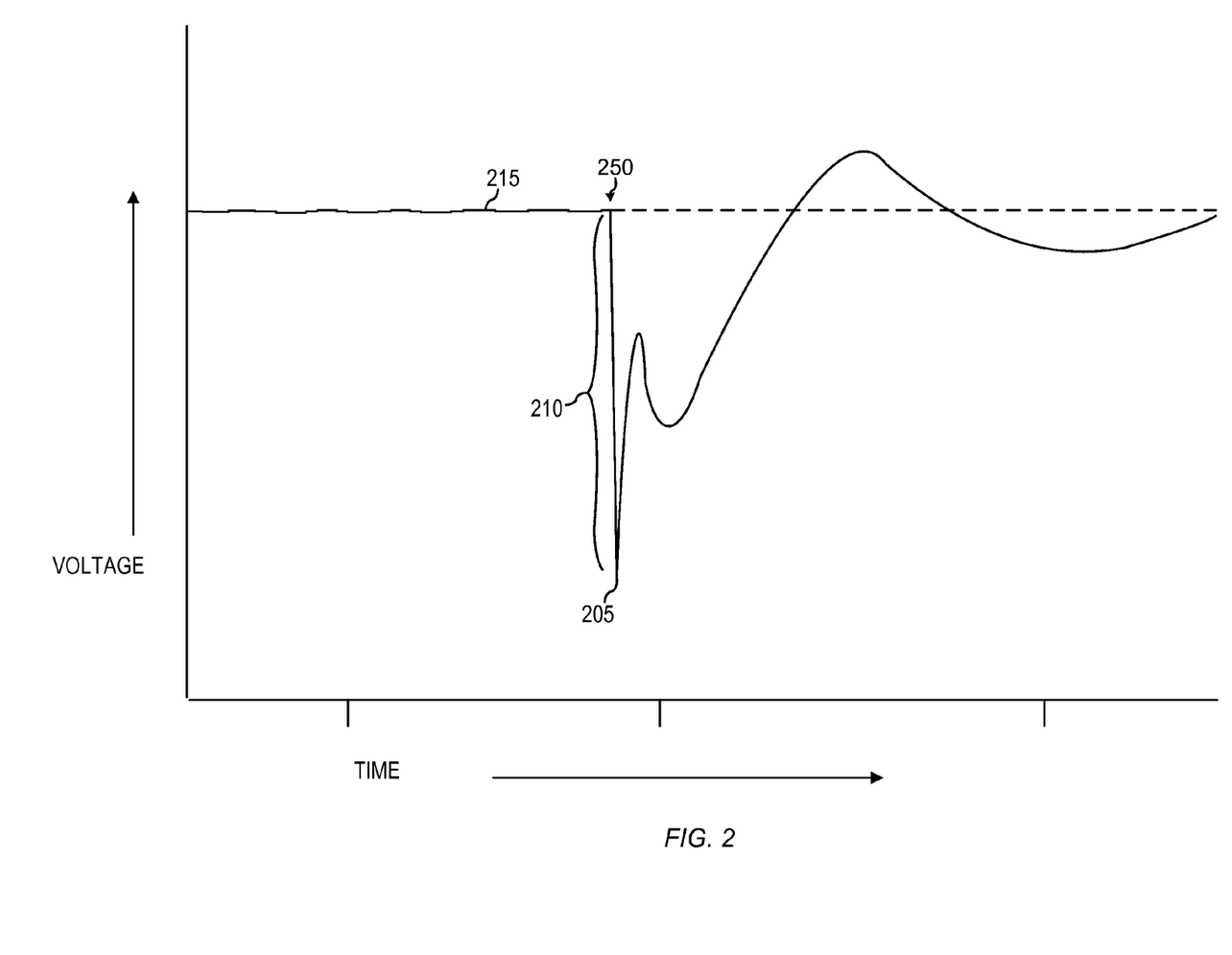
FIG. 2 is a graph of a droop characteristic of a power distribution network in the time domain.

FIG. 2 is a graph of the droop characteristic of a power distribution network in the time domain. The droop characteristic will be described with reference to the PDN of FIG. 1 but similar effects occur in other systems. The graph shows a supply voltage 215 at the SoC in the die domain 105. The y-axis of the graph is voltage and the x-axis of the graph is time. Initially, the SoC draws a low level of current from the battery 165 via the power supply 170. At time 250, the SoC switches to drawing a high level of current. The low level of current is modeled by the switch 160 in the load model being open and the high level of current is modeled by the switch 160 being closed. Initially, the supply voltage 215 (at the load) is at a nominal voltage level. At time 250, the current drawn by the load increases rapidly. This increase in current is satisfied by additional current from the battery 165 flowing through the circuit-board domain 115, the package domain 110, power-supply domain 112, and the die domain 105. The inductances in this path result in a spike-like dip 205 in the supply voltage 215. The spike-like dip 205 may result in the supply voltage 215 dropping below a minimum level for proper operation of the SoC. For example, in some systems, a droop characteristic 210 may be as much as an 18-30% drop in the supply voltage 215 for a 2.3 amp load-current transient occurring in a 4 ns timeframe.

Figure 3:
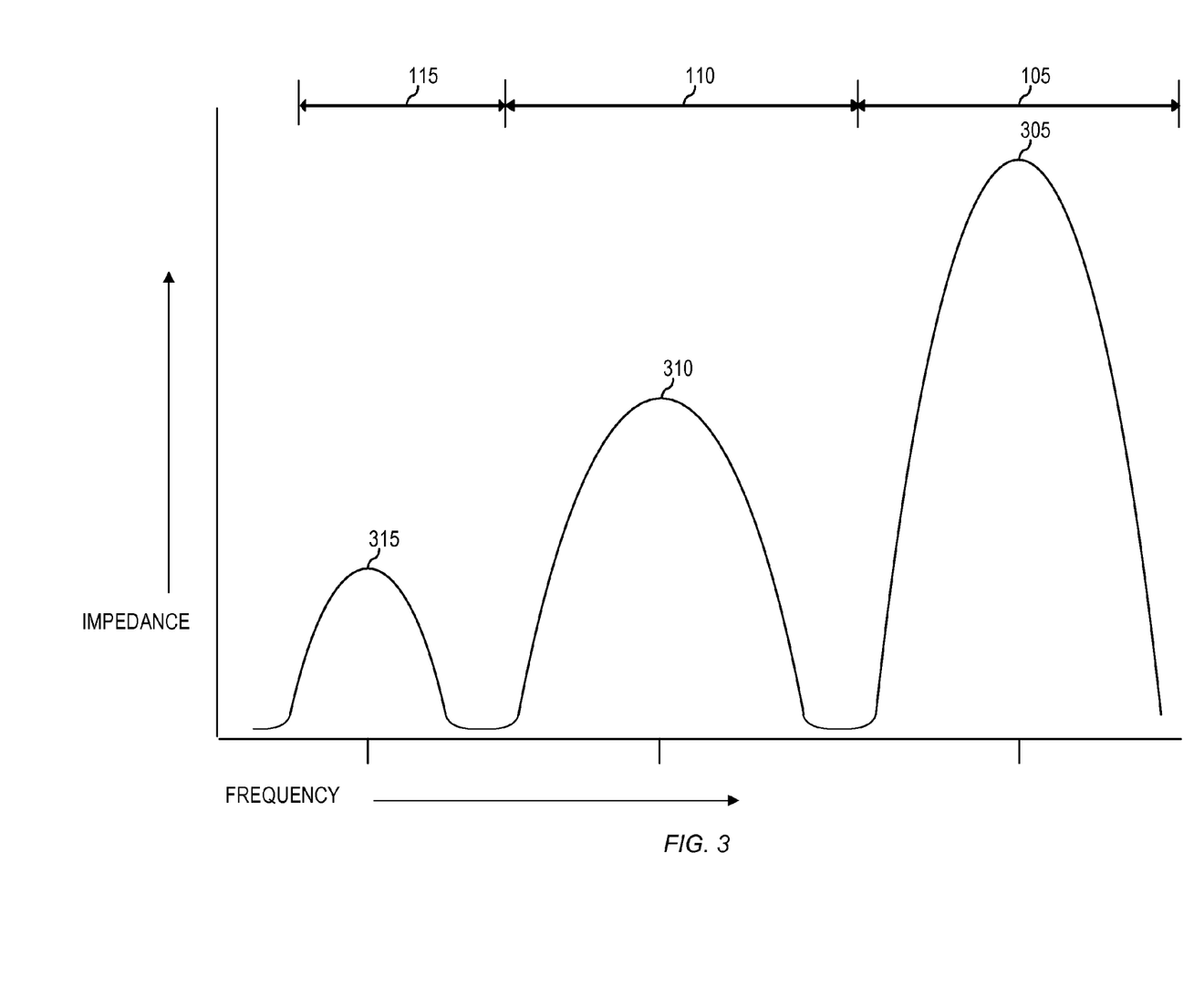
FIG. 3 is a graph of impedance of a power distribution network in the frequency domain.

FIG. 3 is a graph of impedance of a power distribution network in the frequency domain. The graph will be described with reference to the power distribution network of FIG. 1; however, other networks result in similar impedances. The graph shows several impedance peaks that correspond to the respective impedances formed from parasitic elements in the respective PDN interconnect domains. A first impedance peak 305 corresponds to the current limiting impedances in the die domain 105. The first impedance peak 305 may be primarily associated with the frequency dependent impedances seen by the portion of the PDN path on-die. The first impedance peak 305 may have a center frequency of about 100 MHz and may be the largest impedance peak. A second impedance peak 310 corresponds to the current limiting impedances created by the parasitic elements formed as the PDN is routed through the package domain 110. The second impedance peak 310 may have a center frequency of about 2 MHz. A third impedance peak 315 corresponds to the current limiting impedances caused by the parasitic elements in the circuit-board domain 115. The third impedance peak 315 may have a center frequency of about 100-200 kHz. When variations in SoC currents occur at or near the frequencies of the impedance peaks, the effect of voltage droop is increased.

The system of FIG. 1 includes the power supply 170 between the battery 165 and the load device to provide voltage regulation and avoid droop characteristics. The power supply 170 may be a switching-mode power supply (SMPS) and provide power to the load device with the degree of supply voltage regulation that is available according to the regulating abilities of the SMPS. The SMPS may be implemented within the circuit-board domain 115 on a separate die from the load device and provide power through the circuit board interconnection layers to the SoC die (load device in the die domain 105). The SMPS receives power from the battery 165. The battery 165 connects to the SMPS through the circuit board. The SMPS is coupled to the die through the parasitic elements introduced by the interconnection path through the circuit-board domain 115 and the package domain 110. These interconnection path parasitic elements correspond to the package-inter-planar capacitance 135, the package-equivalent-series inductance 140, the package-equivalent-series resistance 145, and the power-supply-domain inductance 190 described above.

Figure 4:
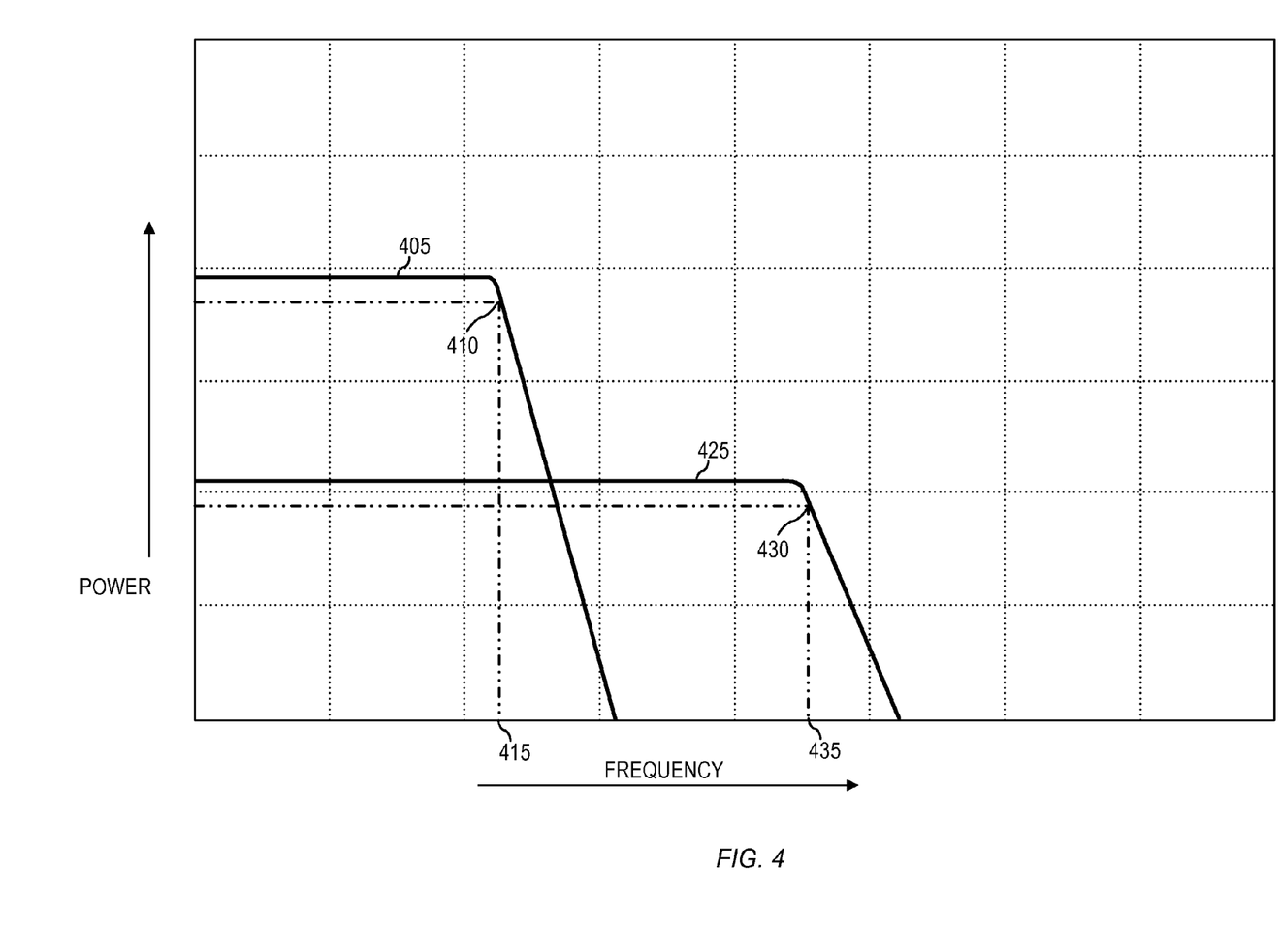
FIG. 4 is a graph of frequency responses of a switching-mode power supply and a low dropout voltage regulator.

FIG. 4 is a graph of frequency responses of a switching-mode power supply (SMPS) and a low dropout voltage regulator (LDO). The graph includes a SMPS frequency response 405 and an LDO frequency response 425 plotted versus frequency. The SMPS frequency response 405 and the LDO frequency response 425 are plotted in terms of output power in FIG. 4. Other measures, for example, current, may also be used. The frequency responses are generally flat at low frequencies and then decline at higher frequencies. The SMPS frequency response 405 may be described as having a SMPS corner frequency 410 where the power is attenuated by 3 dB (or a factor of two) and a corresponding SMPS bandwidth 415. Similarly, the LDO frequency response 425 may be described as having a LDO corner frequency 430 and a corresponding LDO bandwidth 435.

An exemplary SMPS may have a bandwidth of about 2 MHz. Generally, the SMPS bandwidth 415 may occur at about one-fifth of the SMPS clock frequency. This bandwidth is not sufficient for the SMPS to supply rapidly changing power requirements that can occur in an SoC. The SMPS is, however, suited for supplying relatively large amounts of current with a high efficiency. For example, the SMPS may be able to supply 3.0 A with an efficiency of about 85%.

An exemplary LDO may have a bandwidth of about 600 MHz. This bandwidth is much better suited than the SMPS bandwidth for supplying rapidly changing power requirements that can occur in an SoC. The LDO is, however, less efficient than the SMPS. For example, an LDO that receives a 1.2 V input supply voltage and produces a 0.9 V output will have an efficiency less than 75%.

Figure 5:
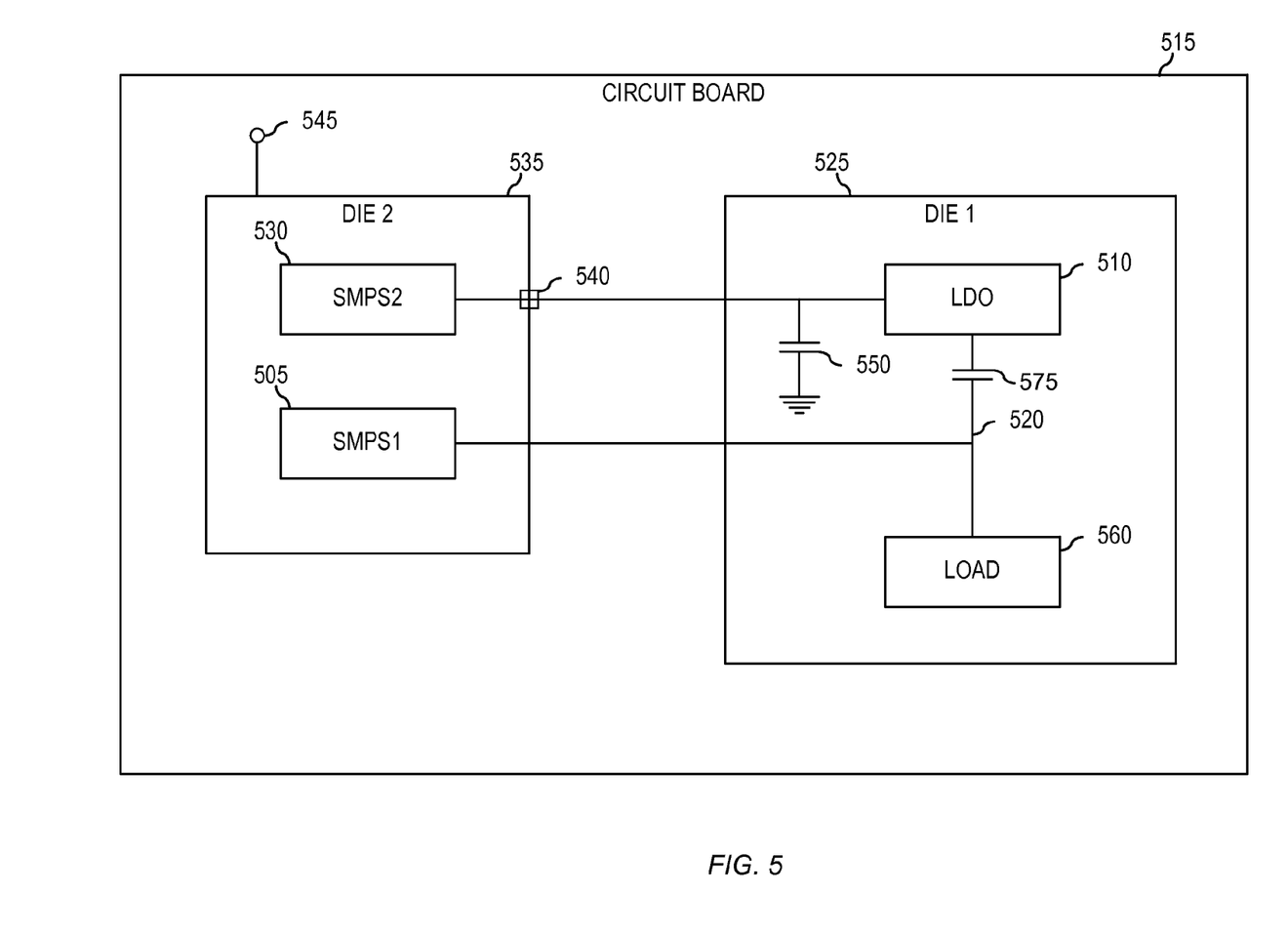
FIG. 5 is a functional block diagram of an electronic system with a capacitively-coupled hybrid parallel power supply according to a presently disclosed embodiment.

FIG. 5 is a functional block diagram of an electronic system including a capacitively-coupled hybrid parallel power supply according to a presently disclosed embodiment. The system uses a hybrid parallel power supply to provide power to a load device 560. The hybrid parallel power supply capacitively couples a power supply (e.g., a switching-mode power supply) with a voltage regulator (e.g., a low dropout voltage regulator). The hybrid parallel power supply combines advantageous features of both switching-mode power supplies and low dropout voltage regulators. The hybrid parallel power supply is power efficient and can supply a stable voltage to a load device, such as a smartphone SoC, whose current demand rapidly changes.

The hybrid parallel power supply includes a first power supply ("SMPS1") 505 connected in parallel with a voltage regulator ("LDO") 510. The first power supply 505 supplies power to a power rail 520. The first power supply 505 works to regulate the power rail 520 to a first target voltage level, for example, 0.9 V. The first target voltage level may be configurable, for example, using a control register. The first power supply 505 receives power from a first supply terminal 545 (e.g., connected to the battery 165 in the system of FIG. 1 via connections on a circuit board 515). The first power supply 505 is able to supply power to the power rail 520 with high efficiency. The first power supply 505 may be a switching-mode power supply (SMPS).

The voltage regulator 510 also supplies power to the power rail 520 via a coupling capacitor 575. The voltage regulator 510 works to regulate the power rail 520 to a second target voltage level. The second target voltage level may be configurable, for example, using a control register. The voltage regulator 510 has an input connected to a second supply terminal 540 from which the voltage regulator 510 receives power. The voltage regulator 510 has an output connected to a first terminal of the coupling capacitor 575. A second terminal of the coupling capacitor 575 connects to the power rail 520. The voltage regulator 510 is able to provide current with a high-frequency-response characteristic to the power rail 520. The voltage regulator 510 may be a low dropout voltage regulator (LDO). An LDO can operate with low headroom (difference between the input voltage and output voltage), for example, regulating a 1.2 V input to produce a 0.9 V output.

The voltage regulator 510, in an embodiment, operates with a Class-AB current mode output. Such circuits can have high bandwidths, for example, 600 MHz. The Class-AB current mode output of the voltage regulator 510 sources current via the coupling capacitor 575 to the power rail 520 (e.g., to the load device 560) when the voltage on the power rail 520 is below the second target voltage level and sinks current via the coupling capacitor 575 from the power rail 520 when the voltage on the power rail 520 is above the second target voltage level. The voltage regulator 510 is capacitively isolated by the coupling capacitor 575 from the first power supply 505. The capacitive isolation provided by the coupling capacitor 575 may maintain stability of the hybrid parallel power supply by preventing contention between differing output levels of the voltage regulator 510 and the first power supply 505. According to certain exemplary embodiments, the coupling capacitor 575 may be about 100 nF. Further, systems may operate reliably with coupling capacitors that have large (e.g., 500 pH) series inductance.

The first power supply 505 and the voltage regulator 510 operate to regulate the voltage level of the power rail 520. This voltage regulation may be understood as the monitoring of the voltage level of the power rail 520 and when the voltage level differs from the respective target voltage level, changing operation of circuits driving the power rail 520 so that the voltage level moves toward the target voltage level. The voltage level of the power rail 520 may vary due to changes in current demand of the load device 560 and limitations in the response of the hybrid parallel power supply due, for example, to output impedances of the first power supply 505 and the voltage regulator 510 and response times of the first power supply 505 and the voltage regulator 510.

The second target voltage level, to which the voltage regulator 510 regulates the power rail 520, may be different from the first target voltage level, to which the first power supply 505 regulates the power rail 520. The second target voltage level may be, for example, an offset voltage less than the first target voltage level. For example, in a hybrid parallel power supply where the first target voltage level is 0.9 V, the second target voltage level may be 088 V. In this arrangement, the first power supply 505 may supply most of the current dissipated by the load device 560 with the voltage regulator 510 rapidly supplying or sinking current in response to changes in the voltage on the power rail 520.

The hybrid parallel power supply of FIG. 5 includes a second power supply ("SMPS2") 530 to supply power to the voltage regulator 510 via second supply terminal 540. The second power supply 530 works to drive the second supply terminal 540 to a third target voltage level. The third target voltage level may be chosen, for example, to allow efficient operation of the voltage regulator 510. The third target voltage level may also be a level used by other components in the system. The third target voltage level may be, for example, 1.2 V when the nominal level on the power rail 520 is 0.9 V. The second power supply 530 is able to supply power to the voltage regulator 510 with high efficiency. The second power supply 530 receives power from the first supply terminal 545. The second power supply 530 may be a switching-mode power supply.

The voltage regulator 510 and the load device 560 may be fabricated on a first die ("DIE 1") 525. Since the voltage regulator 510 and the load device 560 are located together, parasitic impedances between the voltage regulator 510 and the load device 560 are small. Portions of the power rail 520 may also be fabricated on the first die 525. The coupling capacitor 575 may be fabricated on the first die 525 or external to the first die 525 (e.g., on the circuit board 515 or an integrated-circuit package housing the first die 525) or a combination of on-die and external capacitors. Board and package parasitic impedances do not substantially impair the connection between the voltage regulator 510, the coupling capacitor 575, and the load device 560.

In the embodiment of FIG. 5, the first die 525 includes an on-die capacitor 550 connected to the second supply terminal 540, which supplies power to the voltage regulator 510. The on-die capacitor 550 may be referred to as a bypass capacitor. The on-die capacitor 550 can supply current to the voltage regulator 510 with a high-frequency-response characteristic. The on-die capacitor 550 supports the voltage regulator 510 supplying current to the load device 560 with a high-frequency-response characteristic and aids in reducing a droop characteristic that would otherwise occur on the power rail 520 when the current demand of the load device 560 rapidly changes. The on-die capacitor 550 stores more charge than a capacitor on the power rail 520 due to the higher voltage of second supply terminal 540 compared to the power rail 520. As a result, the parallel combination of the voltage regulator 510 and the first power supply 505 may operate without (or with little) further capacitance, such as a bulk capacitor, an external capacitor, a landside capacitor, or an embedded-passive-substrate (EPS) capacitor. According to certain exemplary embodiments, the on-die capacitor 550 may be about 220 nF.

The on-die capacitor 550 may alternatively be fabricated external to the first die 525, for example, on a circuit board or integrated circuit package, or a combination of on-die and external capacitors. Provisioning of the on-die capacitor 550 and the coupling capacitor 575 on die, on package, or on circuit board may be determined according to the relative costs and performance of the respective implementations. These costs may include the costs of capacitors, interconnection, and package pins. Performance of the power distribution network generally improves with capacitance closer to the load device.

The first power supply 505 and the second power supply 530 may be fabricated on a second die ("DIE 2") 535. Combining the voltage regulator 510 and the load device 560 on the first die 525 and combining the first power supply 505 and the second power supply 530 on the second die may allow the various components to be manufactured using fabrication processes that are selected for the particular requirements of the components. For example, the voltage regulator 510 and the load device 560 may be manufactured using a high-density complementary metal-oxide-semiconductor (CMOS) process that allows many functions to be provided by the load device 560 and the first power supply 505 and the second power supply 530 may be manufactured using a high-power process that allows high efficiency power supplies. The first die 525 and the second die 535 may be mounted (directly or using integrated circuit packages) on an interconnection substrate, such as the circuit board 515. In an embodiment, the second die 535 may be a power-management integrated circuit (PMIC).

A system using a hybrid parallel power supply may be more power efficient than systems using an SMPS, an LDO, or a series SMPS-LDO combination. The efficiency of the hybrid parallel power supply for an example implementation is about 76%. The hybrid parallel power supply can also lower system power by allowing a smaller voltage guard-band. This is particularly valuable in systems (such as a CMOS SoC) where the power is proportional to the voltage squared. An SoC with the voltage regulator 510 and the load device 560 may also have a reduced number of pins due, for example, to reduced use of decoupling capacitors on the power rail 520.

The parallel combination of the LDO and SMPS combines the characteristics of the individual circuits to efficiently supply power while reducing voltage droop caused by rapid load current changes. The SMPS can be viewed as generally involved in supplying the steady-state current needs of the load device. In this way, the relatively large current demand of the load device is provided with the high efficiency of the SMPS. The LDO can be viewed as generally involved in supplying current to the load device in response in changes in the load current that could otherwise cause large voltage droops. That is, the LDO rapidly reacts to drops in the supply voltage and supplies current to the load device until the SMPS can react. The high bandwidth of the LDO enables the hybrid parallel power supply to provide sufficient current in a timely manner such that the droop characteristics are greatly reduced. Additionally, a parallel combination of the LDO and SMPS may allow use of a simplified SMPS, for example, an SMPS with fewer phases.

Figure 6:
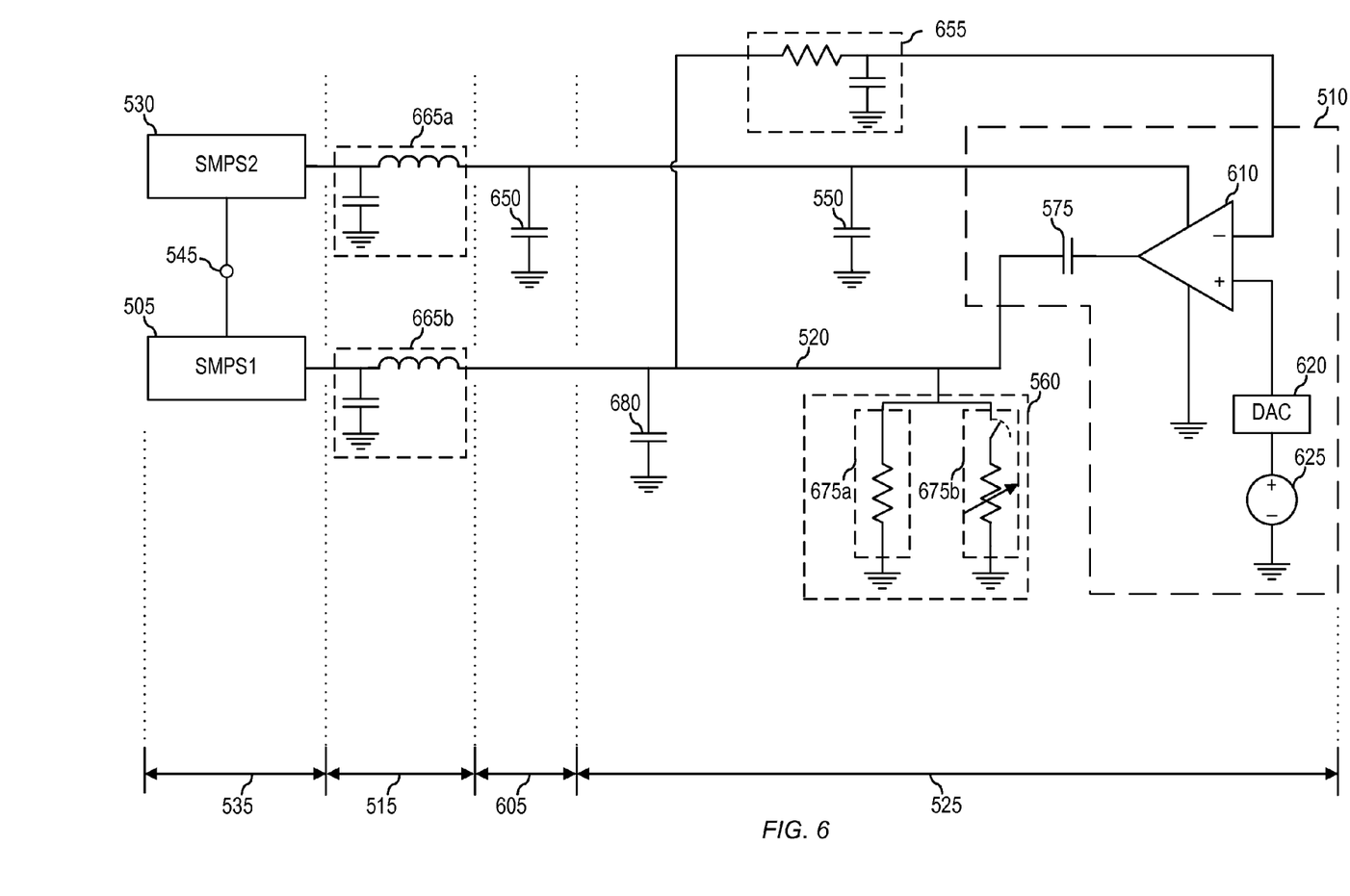
FIG. 6 is a functional block diagram of an electronic system with a capacitively-coupled hybrid parallel power supply according to a presently disclosed embodiment.

FIG. 6 is a functional block diagram of an electronic system with a capacitively-coupled hybrid parallel power supply according to a presently disclosed embodiment. The hybrid parallel power supply of FIG. 6 generally corresponds to the hybrid parallel power supply in the system of FIG. 5. According, the description of the system of FIG. 6 may omit details common to the system of FIG. 5. The system of FIG. 6 includes the first power supply 505 supplying power to the load device 560 and the voltage regulator 510 (receiving power from the second power supply 530) supplying power to the load device 560 via the coupling capacitor 575. The load device 560 (which may be an SoC including a processor and other circuits) is modeled with an equivalent load impedance 675$a$ and a switched equivalent load impedance 675$b$.

The voltage regulator 510 includes an operational amplifier 610, the coupling capacitor 575, a reference converter ("DAC") 620, and a bandgap source 625. The reference converter 620 and the bandgap source 625 combine to produce a reference voltage that sets the second target voltage level at which the voltage regulator 510 supplies power to the power rail 520. The bandgap source 625 produces a reference output voltage that is nearly constant (e.g., less than 1% variation with process, supply voltage, and temperature). The bandgap source 625, in an embodiment, produces the reference output voltage at a sub-bandgap level (e.g., 0.64 V). The reference converter 620 scales the reference output voltage from the bandgap source 625 to produce the reference voltage. For example, the reference converter 620 may scale a 0.64 V reference output voltage from the bandgap source 625 by 11/8 to produce a 0.88 V reference voltage. The reference converter 620 may be a digital-to-analog converter (DAC). The reference converter 620 may receive a digital input to configure the reference voltage. The digital input may be used to adjust the second target voltage level.

The second target voltage level used by the voltage regulator 510, in an alternative embodiment, is set by a reference level produced by a reference level module. The reference level module may supply the reference voltage by scaling and low-pass filtering the power rail 520. Setting the second target voltage level at a scaled level relative to the average level on power rail 520 may avoid concern with mismatches between the first and second target voltage levels. The voltage regulator 510 then supplies current to the load device 560 via the coupling capacitor 575 when the power rail 520 drops below the reference voltage. The reference level module may, for example, use a scale factor (of the second target voltage level relative to the level of the power rail 520) of 15/16. The amount of filtering may be chosen, for example, based on the bandwidth of the first power supply 505. The reference level module may include a resistor divider to provide scaling coupled with a capacitor to provide filtering. The resistor divider may be variable so that the amount of scaling can be adjusted. The filtering may also be adjustable.

The operational amplifier 610 has an output coupled to a first terminal of the coupling capacitor 575. A second terminal of the coupling capacitor 575 is coupled to the power rail 520. The coupling capacitor 575 may be, for example, fabricated using transistor gate capacitance. Other capacitor structures may additionally or alternatively be used. Additionally, combinations of on die, on package, and on circuit board capacitors may be selected according to the relative costs and performance of the respective implementations. These costs may include the costs of the capacitors, interconnection, and package pins. Performance of the power distribution network generally improves with capacitance closer to the load device 560 and the operational amplifier 610.

The operational amplifier 610 has its non-inverting input ("+") connected to the reference voltage from the reference converter 620 and its inverting input ("−") coupled to the power rail 520. The inverting input of the operational amplifier 610 may be coupled directly to the power rail 520 or may be coupled to the power rail 520 via a feedback device 655. In the embodiment illustrated in FIG. 6, a low-pass filter provides feedback from the power rail 520 to the operational amplifier 610. The low-pass filter provides a low-pass filtered version of the voltage of the power rail 520 to the operational amplifier 610. The low-pass filter may be implemented, as illustrated in FIG. 6, with a resistor-capacitor network.

Figure 10:
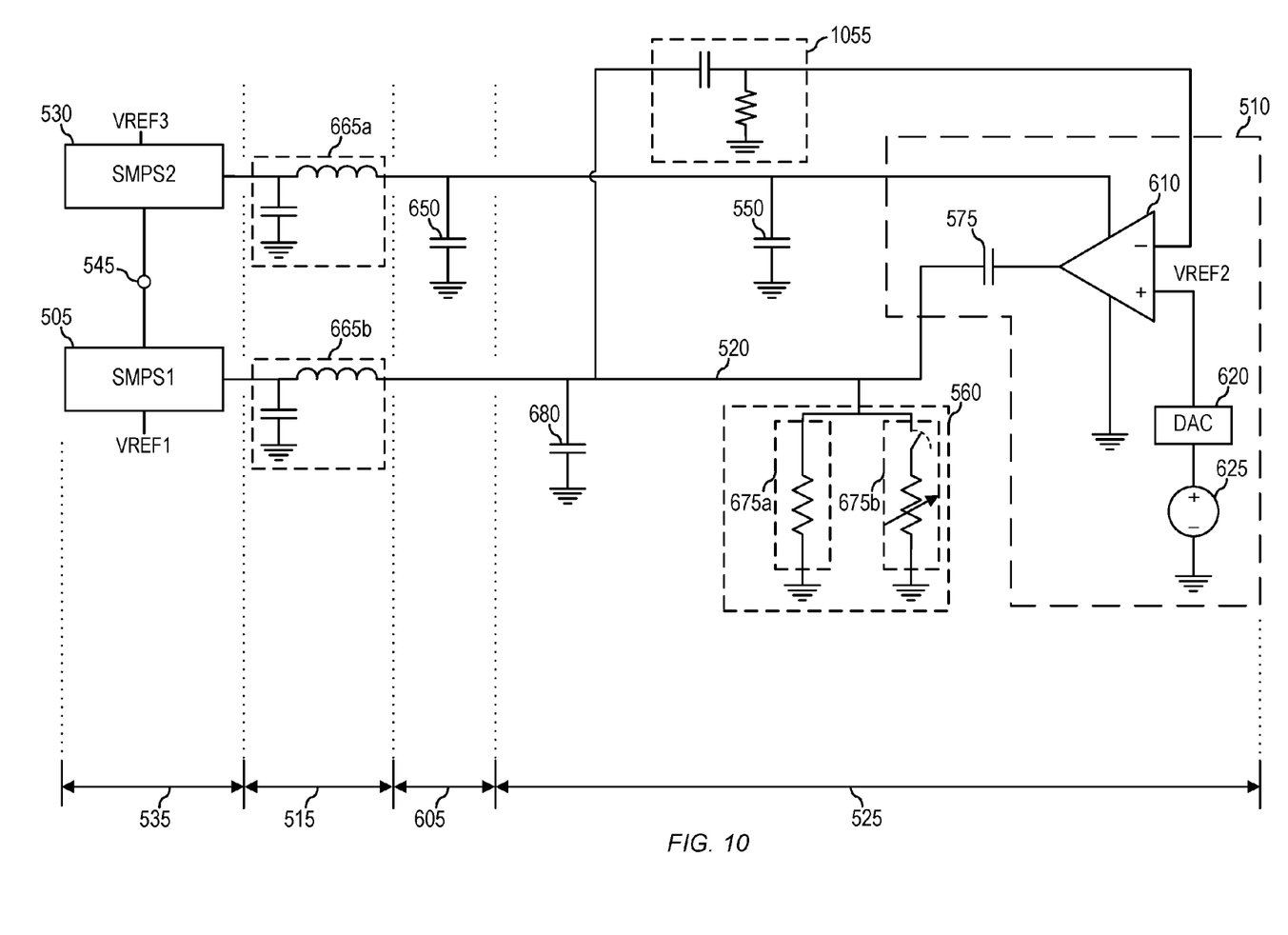
FIG. 10 is a functional block diagram of an electronic system with a capacitively-coupled hybrid parallel power supply according to a presently disclosed embodiment.

FIG. 10 is a functional block diagram of an electronic system with a capacitively-coupled hybrid parallel power supply according to a presently disclosed embodiment. The electronic system of FIG. 10 is similar to the electronic system of FIG. 6 with like referenced elements performing like functions. However, the feedback device 1055 utilizes a high-pass filter. In such an implementation, the voltage regulator 510 may supply current to the load device 560 in response to high-frequency changes in the voltage on the power rail 520 such as a droop due to rapid changes in the current demand of the load device 560. In an example embodiment, the high-pass filter includes a capacitor coupled between the power rail 520 and the inverting input of the operational amplifier 610 and a resistor coupled between the inputs of the operational amplifier 610. The second target voltage level may be set, for example, to a midpoint of the output range of the operational amplifier 610. The frequency response of the high-pass filter may be chosen based, for example, on the response characteristics of the first power supply 505.

Returning to FIG. 6, the characteristics of the feedback device 655 may be arranged to tune the power regulation response of the voltage regulator 510 and provide a particular response to a droop event. The voltage on the power rail 520 may have time-varying voltage components that may be conceptualized as a signal riding on top of the first target voltage level. The feedback device 655 (or 1055 in FIG. 10) may, for example, filter out high-frequency components or low-frequency components appearing on the power rail 520 and pass remaining components to the inverting input of the operational amplifier 610. The feedback device 655 can effectively change the bandwidth of the voltage regulator 510.

The operational amplifier 610 may be a Class-AB operational amplifier, for example, a class-AB operational transconductance amplifier (OTA). Other types of operational amplifiers may also be used, for example, an amplifier with a voltage-mode output. An operational transconductance amplifier can have high bandwidth so that the voltage regulator 510 can provide current to the power rail 520 with a high-frequency-response characteristic. Additionally, a Class-AB OTA may be fabricated using standard logic transistors and without special devices or device fabrication techniques. The voltage regulator 510 may also have low quiescent current and thus contribute to overall power reduction for the system. The LDO may also be implemented within a small amount of die area.

The output of the operational amplifier 610 sources or sinks current based on the voltage difference between the inverting and non-inverting inputs. The feedback loop from the output of the operational amplifier 610 through the coupling capacitor 575 to the power rail 520 back to the inverting input of the operational amplifier 610 via the feedback device 655 allows the voltage regulator 510 to regulate the level of the power rail 520.

The system of FIG. 6 includes the on-die capacitor 550 and a second capacitor 650 located in a package 605 housing the SoC and connected to the input of the voltage regulator 510. The values of the second capacitor 650 and the on-die capacitor 550 may be selected based on, for example, cost, performance, and size. In an example embodiment, the capacitance of the second capacitor 650 may be about 200 times greater than the capacitance of the on-die capacitor 550. For example, the capacitance of the second capacitor 650 may be 200 nF and the capacitance of the on-die capacitor 550 may be 1 nF. In some embodiments, a further capacitor may be located on the circuit board 515 and connected to the input of the voltage regulator 510.

In some embodiments, a rail capacitor 680 located in the first die 525 is connected to the power rail 520. The rail capacitor 680 may work in combination with the on-die capacitor 550 to provide current to the load device 560 during a droop event. Other combinations of capacitors on the circuit board 515, the package 605, the first die 525, or other locations may also be used.

FIG. 6 also shows interconnection-parasitic elements 665*a,b* that represent the reactive elements encountered in making various electrical connections between the first power supply 505 and the power rail 520 and the second power supply 530 and the voltage regulator 510. The interconnection-parasitic elements 665*a,b* are shown in the domain of the circuit board 515 between the first die 525 and the second die 535. The interconnection-parasitic elements 665*a,b* may be combinations of resistors, capacitors, and inductors that represent an equivalent impedance encountered by electrical connections spanning between the first die 525 and the second die 535.

Figure 7:
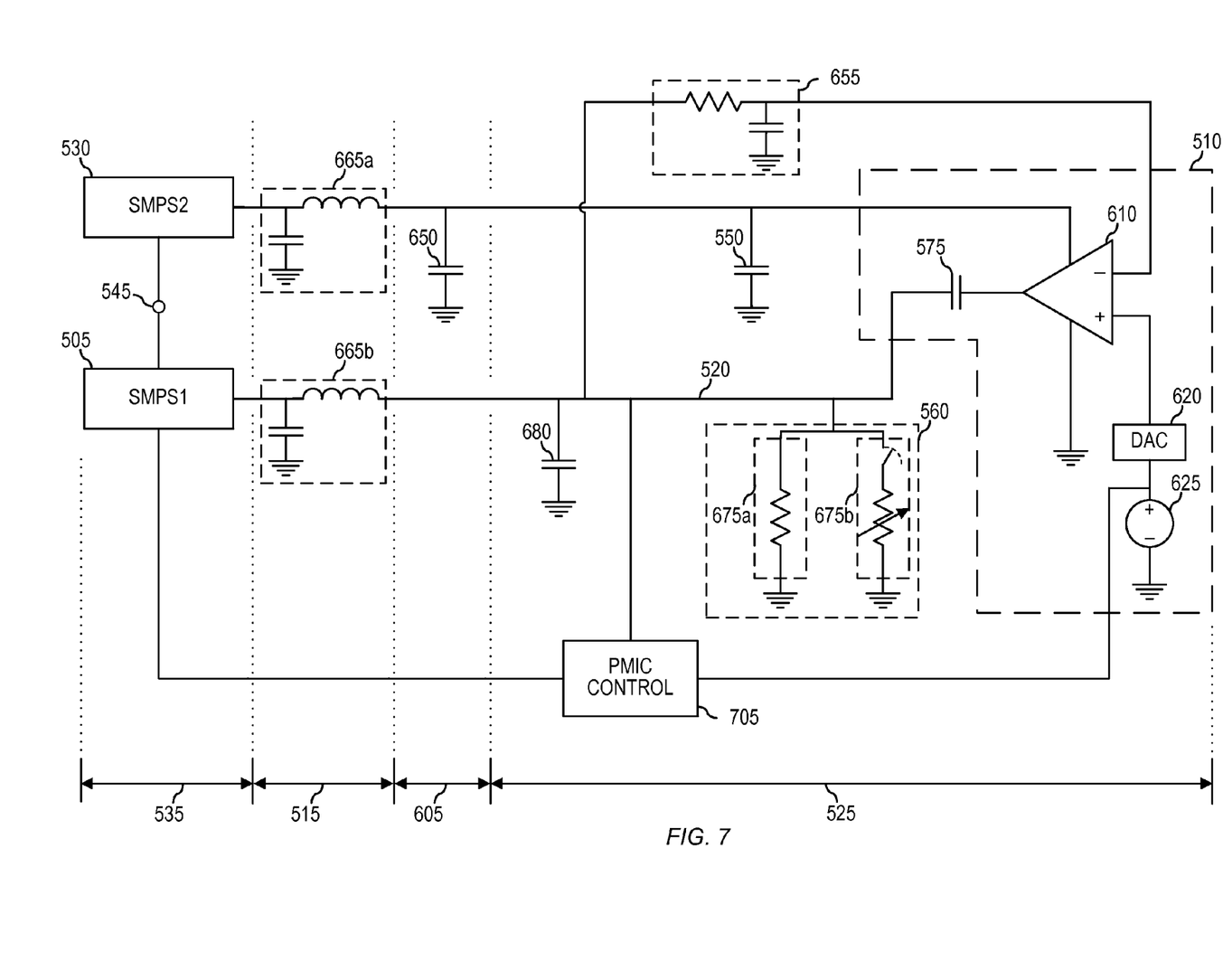
FIG. 7 is a functional block diagram of an electronic system with a capacitively-coupled hybrid parallel power supply according to a presently disclosed embodiment.

FIG. 7 is a functional block diagram of an electronic system with a capacitively-coupled hybrid parallel power supply according to a presently disclosed embodiment. The hybrid parallel power supply of FIG. 7 is similar to the hybrid parallel power supply in the system of FIG. 6. Accordingly, the description of the system of FIG. 7 omits details common to the system of FIG. 6.

The capacitively-coupled hybrid parallel power supply of FIG. 7 includes a PMIC control module 705 to supply a control signal to the first power supply 505. The PMIC control module 705 may also supply a control signal to the second power supply 530. The PMIC control module 705 may be implemented in various ways. When the first power supply 505 is arranged to receive a digital control signal, the PMIC control module 705 supplies the control signal in digital form. For example, the PMIC control module 705 may signal the first target voltage level to the first power supply 505 using, for example, a serial protocol. The PMIC control module 705 may signal the first target voltage level open loop. Alternatively, the PMIC control module 705 may signal the first target voltage level closed loop by, for example, comparing the relative levels of the power rail 520 and the reference output voltage from the bandgap source 625.

Alternatively, when the first power supply 505 is arranged to receive an analog control signal, the PMIC control module 705 supplies the control signal in analog form. The PMIC control module 705 may signal the first target voltage level to the first power supply 505 open loop by supplying the control signal at the first target voltage level or a scaled version of the first target voltage level. Alternatively, the PMIC control module 705 may signal the first target voltage level closed loop by, for example, comparing the relative levels of the power rail 520 and reference output voltage from the bandgap source 625. The first power supply 505 can utilize the closed-loop control signal to produce a corresponding change in the voltage generated by the first power supply 505 on the power rail 520.

The PMIC control module 705, in an example closed-loop analog embodiment, includes a second operational amplifier having an output that provides the control signal to the first power supply 505. The non-inverting input of the second operational amplifier connects to a supply reference voltage. The inverting input of the second operational amplifier connects to the power rail 520. The supply reference voltage sets the first target voltage level at which the first power supply 505 supplies power to the power rail 520. The supply reference voltage is produced by a second reference converter that scales the reference output voltage from the bandgap source 625 to produce the supply reference voltage. For example, the second reference converter may scale a 0.64 V reference output voltage from the bandgap source 625 by 45/32 to produce a 0.9 V supply reference voltage. The second reference converter may be a direct current (DC) converter, also known as a DC-to-DC converter. The second reference converter may receive a digital input to adjust the level of the supply reference voltage.

Figure 8:
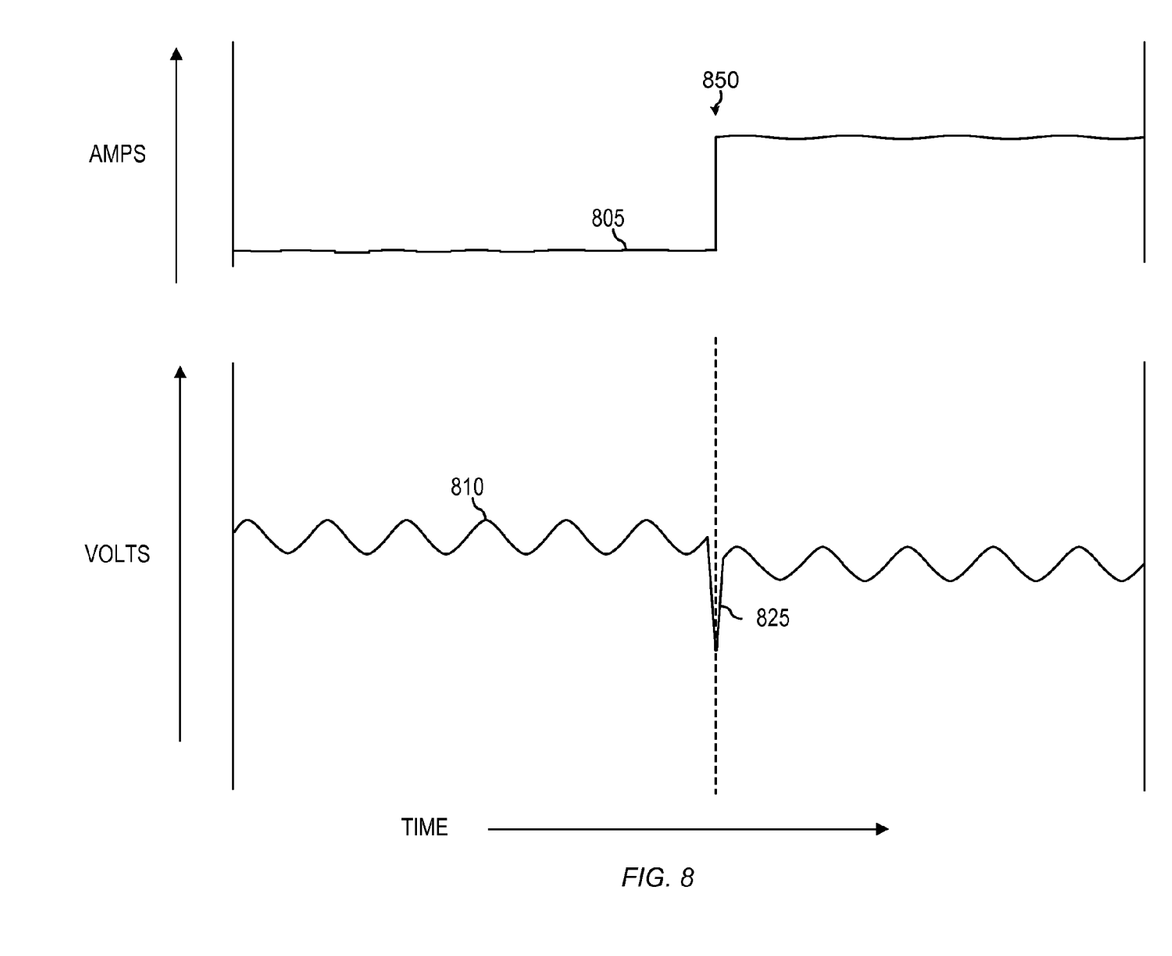
FIG. 8 is a time-domain graph of a droop characteristic of a hybrid parallel power supply according to a presently disclosed embodiment.

FIG. 8 is a time-domain graph of a droop characteristic in a system using a hybrid parallel power supply according to a presently disclosed embodiment. The graph illustrates operation of the hybrid parallel power supplies of FIGS. 5-7. Similar to the graph of FIG. 2, the graph of FIG. 8 illustrates an example of a rapid change in current at time 850. The graph of FIG. 8 plots load current 805 for the load device 560 and supply voltage 810 for the power rail 520. Prior to time 850, the load current 805 is 1.25 A. At time 850, the load current 805 rapidly increases to 3.55 A.

In addition to the step in current demand of the load device at time 850, small variations in the load current 805 occur, for example, as different calculations are performed in a processor in the load device 560. These small variations in the load current 805 cause ripples (small variations, e.g., 4 mV) in the supply voltage 810. The ripples in the supply voltage may be at frequencies that are higher than the bandwidth of the first power supply 505. The first power supply 505 will then supply current to the power rail 520 based on a low-pass filtered average of the supply voltage. The ripples in the supply voltage may, however, be at frequencies that are within the bandwidth of the voltage regulator 510. The voltage regulator 510 will then supply current the power rail 520 that reduces the magnitude of the ripples.

Prior to time 850, the supply voltage 810 is at a nominal voltage level, for example, 0.9 V. At time 850, the rapid increase in load current causes a droop characteristic 825 in the supply voltage 810. The high frequency response of the voltage regulator 510 allows it to quickly increase current supplied to the load device 560 to reduce the magnitude of the droop characteristic 825. The current provided to the load through the coupling capacitor 575 by the voltage regulator 510 conforms with the voltage-current relationship:

$$i = C\frac{dv}{dt}.$$

Since the voltage change across the coupling capacitor can be much larger than the magnitude of the voltage droop (due to the change in the output of the voltage regulator 510), the coupling capacitor 575 can supply a much larger current to the load than a similarly sized bypass capacitor (e.g., coupled between the power rail 520 and the ground reference).

An example system has a resultant droop characteristic of less than 7% for a 2.3 A/5 ns step change in load current. The apparatus and systems described above relate to a droop characteristic defined in terms of a spike-like lowering of the supply voltage at a load device on a die. A similar effect, but with a positive-going spike, may be realized in certain circuit situations where the current demand of a load device rapidly decreases. The capacitively-coupled hybrid parallel power supplies disclosed herein may reduce positive-going spikes in the power supply level by the voltage regulator 510 sinking current from the power rail 520 via the coupling capacitor 575.

Figure 9:
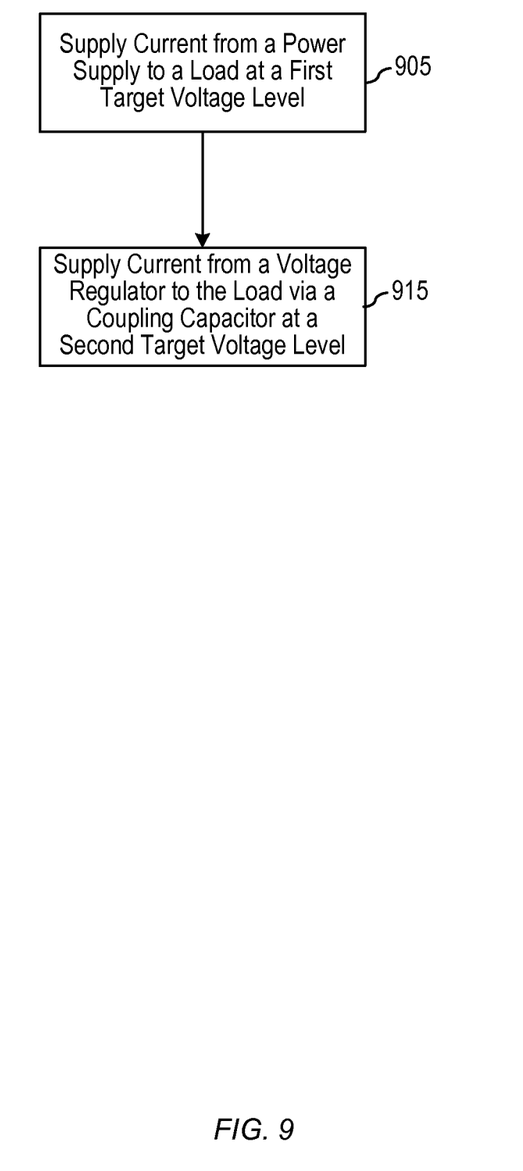
FIG. 9 is a flowchart of a process for supplying power to an electronic device according to a presently disclose embodiment.

FIG. 9 is a flowchart of a process for supplying power to an electronic device according to a presently disclose embodiment. The process will be described with reference to the system of FIG. 5; however, various embodiments of the process may be applied to any suitable apparatus.

In block 905, the process supplies current from a power supply to a load device via a power rail at a first target voltage level. In block 905, an efficient power supply, such as a switching mode power supply, is used. For example, the first power supply 505 can regulate the power rail 520 to a first target voltage level to supply current to the load device 560.

In block 915, the process supplies current from a voltage regulator to the load device via a coupling capacitor at a second target voltage level. The supplied current may be negative, for example, when the level of the power rail 520 is higher than a desired regulation level. In block 915, a voltage regulator, such as a low dropout voltage regulator, with a high-frequency-response characteristic is used. For example, the voltage regulator 510 can regulate the power rail 520 to a second supply voltage level to supply current to the load device 560. The first target voltage level and the second target voltage level may be the same or different and may be configurable. The process may generate the first target voltage level and the second target voltage level by generating a reference output voltage based on a bandgap source and then generating the second target voltage level based on a first digital input and the reference output voltage and generating the first target voltage level based on a second digital input and the reference output voltage.

The process of FIG. 9 may be modified, for example, by adding or altering blocks. Additionally, blocks may be performed concurrently.

Although features of the invention are described above for particular embodiments, many variations are possible. For example, capacitively-coupled hybrid parallel power supplies may be formed using other fabrication processes including processes different types of transistors. Additionally, hybrid parallel power supplies may use different types of voltage regulators and different types of power supplies. Further, hybrid parallel power supplies may have different numbers of power supplies and voltage regulators. In another variation, the voltage regulator 510 can be shut off and removed from providing voltage regulation. In yet another variation, a low-power retention voltage regulator is included on the SoC for use during standby modes. Additionally, features of the various embodiments may be combined in combinations that differ from those described above.

Those of skill in the art will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block or distributed across to modules or blocks without departing from the invention.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A hybrid parallel power supply, comprising:
a first power supply connected to a power rail and configured to supply current to a load device via the power rail, the first power supply being further configured to regulate the power rail to a first target voltage level, the regulation of the power rail to the first target voltage level including comparing the power rail to the first target voltage level;
a coupling capacitor having a first terminal coupled to the power rail; and
a linear voltage regulator connected in parallel with the first power supply and coupled to a second terminal of the coupling capacitor, the voltage regulator configured to regulate the power rail to a second target voltage level, the regulation of the power rail to the second target voltage level including comparing the power rail to the second target voltage level,
wherein the first power supply is operable to supply current with a higher efficiency number than an efficiency number of the linear voltage regulator, and wherein the linear voltage regulator is operable to regulate the power rail with higher bandwidth than the first power supply.

2. The hybrid parallel power supply of claim 1, wherein the first power supply is a switching mode power supply.

3. The hybrid parallel power supply of claim 1, wherein the first target voltage level equals the second target voltage level.

4. The hybrid parallel power supply of claim 1, further comprising
a second power supply configured to supply power at a third target voltage level to an input of the voltage regulator, the third target voltage level selected to enable the linear voltage regulator to regulate the power rail to the second target voltage level,
wherein the first and second power supplies are configured to receive power from the external power source.

5. A hybrid parallel power supply, comprising:
a first power supply connected to a power rail and configured to supply current to a load device via the power rail, the first power supply being further configured to regulate the power rail to a first target voltage level, the regulation of the first target voltage level including comparing the power rail to the first target voltage level;
a coupling capacitor having a first terminal coupled to the power rail; and
a linear voltage regulator coupled to a second terminal of the coupling capacitor, the voltage regulator configured to regulate the power rail to a second target voltage level, the regulation of the second target voltage level including comparing the power rail to the second target voltage level,
wherein the voltage regulator comprises an operational amplifier having a first input coupled to the power rail, a second input arranged to receive a reference voltage at the second target voltage level, and an output connected to the output of the voltage regulator.

6. The hybrid parallel power supply of claim 5, wherein the first input of the operational amplifier is coupled to the power rail by a high-pass filter.

7. The hybrid parallel power supply of claim 5, wherein the operational amplifier is an operational transconductance amplifier.

8. The hybrid parallel power supply of claim 5, wherein the operational amplifier is a class-AB operational amplifier.

9. The hybrid parallel power supply of claim 5, wherein the voltage regulator further comprises:
a bandgap source configured to produce a reference output voltage; and
a first reference converter configured to supply the reference voltage to the operational amplifier based on a first digital input and the reference output voltage from the bandgap source.

10. A hybrid parallel power supply, comprising:
a first power supply connected to a power rail and configured to supply current to a load device via the power rail, the first power supply being further configured to regulate the power rail to a first target voltage level, the regulation of the power rail to the first target voltage level including comparing the power rail to the first target voltage level;
a coupling capacitor having a first terminal coupled to the power rail;
a voltage regulator coupled to a second terminal of the coupling capacitor, the voltage regulator configured to regulate the power rail to a second target voltage level, the regulation of the power rail to the second target voltage level including comparing the power rail to the second target voltage level,
wherein the voltage regulator is disposed on a first die with the load device and the first power supply is disposed on a second die.

11. The hybrid parallel power supply of claim 10, wherein the coupling capacitor includes a capacitor disposed on the first die.

12. A method of supplying power to a load device, the method comprising:
comparing a power rail connected to the load device to a first target voltage level;
supplying current from a first power supply to the load device via the power rail based on the comparison of the power rail to the first target voltage level;
comparing the power rail to a second target voltage level;
supplying current from a voltage regulator to the load device via a coupling capacitor based on the comparison of the power rail to the second target voltage level; and
high-pass filtering the voltage of the power rail; and
supplying the current from the voltage regulator based on the high-pass filtered voltage of the power rail.

13. The method of claim 12, wherein the first power supply is a switching mode power supply.

14. The method of claim 12, wherein the voltage regulator includes a class-AB operational amplifier.

15. The method of claim 12, wherein the first target voltage level equals the second target voltage level.

16. The method of claim 12, wherein supplying the current from the voltage regulator comprises:
amplifying a difference between a voltage of the power rail and the second target voltage level; and
supplying the current from the voltage regulator based on the amplified difference.

17. The method of claim 12, further comprising:
powering the first power supply and a second power supply from an external power source; and
supplying current from the second power supply to the voltage regulator at a third target voltage level selected to enable the voltage regulator to regulate the power rail to the second target voltage level.

18. A hybrid parallel power supply, comprising:
a first means for supplying power connected to a power rail and configured to supply current at a first target voltage level to a load device via the power rail, the first means for supplying power receiving power from the means for powering;
a coupling capacitor having a first terminal coupled to the power rail;
a means for regulating voltage coupled to a second terminal of the coupling capacitor and configured to regulate the power rail to a second target voltage level,
wherein the means for regulating voltage is disposed on a first die with the load device and the first means for supplying power is disposed on a second die.

19. The hybrid parallel power supply of claim 18, wherein the first means for supplying power is a switching mode power supply.

20. The hybrid parallel power supply of claim 18, wherein the means for regulating voltage includes a class-AB operational amplifier.

21. The hybrid parallel power supply of claim 18, wherein the first target voltage level equals the second target voltage level.

22. The hybrid parallel power supply of claim 18, wherein the means for regulating voltage comprises an operational amplifier having a first input coupled to the power rail, a second input arranged to receive a reference voltage at the second target voltage level, and an output connected to the second terminal of the coupling capacitor.

23. The hybrid power supply of claim 18, further comprising
a second means for supplying power configured to supply power at a third target voltage level to an input of the means for regulating voltage,
wherein the first means for supplying power and the second means for supplying power are configured to receive power from an external source of power.

24. The hybrid parallel power supply of claim 18, wherein the coupling capacitor includes a capacitor disposed on the first die.

25. The hybrid parallel power supply of claim 22, wherein the first input of the operational amplifier is coupled to the power rail by a high-pass filter.

26. The hybrid parallel power supply of claim 22, wherein the operational amplifier is an operational transconductance amplifier.

27. The hybrid parallel power supply of claim 22, wherein the means for regulating voltage further comprises:
a bandgap source configured to produce a reference output voltage; and
a first reference converter configured to supply the reference voltage to the operational amplifier based on a first digital input and the reference output voltage from the bandgap source.

* * * * *